United States Patent [19]

Stoneburner, deceased

[11] 3,876,505

[45] Apr. 8, 1975

[54] MANUFACTURE OF ACTIVATED CARBON FROM SIZED COAL

[75] Inventor: George Robert Stoneburner, deceased, late of Pittsburgh, Pa. by Jennie K. Stoneburner, administratrix

[73] Assignee: Calgon Corporation, Robinson Township, Pa.

[22] Filed: Dec. 8, 1972

[21] Appl. No.: 313,463

[52] U.S. Cl. ............... 201/8; 201/36; 201/37; 252/445; 423/460
[51] Int. Cl. ............... C01b 31/08; C10b 53/08
[58] Field of Search ............ 201/7, 8, 31, 36, 37; 252/421, 445; 423/445, 449, 460, 461

[56] References Cited
UNITED STATES PATENTS

| | | | |
|---|---|---|---|
| 1,893,363 | 1/1933 | Godel | 201/36 |
| 2,339,742 | 1/1944 | Fuchs | 252/421 |
| 2,407,268 | 9/1946 | Goss | 201/8 |
| 3,070,515 | 12/1962 | Sylvander | 201/36 |
| 3,446,493 | 5/1969 | Orio Imai et al. | 423/449 |
| 3,565,827 | 2/1971 | Friday | 201/31 |

OTHER PUBLICATIONS

Wagner, Frederick H., "Coaland Coke," Copyright 1916, McGraw-Hill Book Company, Inc., pp. 5-8.

*Primary Examiner*—A. Louis Monacell
*Assistant Examiner*—D. Sanders
*Attorney, Agent, or Firm*—Raymond M. Speer; Frank M. Mahon

[57] ABSTRACT

Activated carbon comparable to conventional granular activated carbon is manufactured without the steps of pulverizing, mixing, briquetting, and carbonizing. The carbon is made from dried, sub-bituminous coal by sizing, simultaneously drying and oxidizing, and thereafter activating the sized coal.

2 Claims, No Drawings

MANUFACTURE OF ACTIVATED CARBON FROM SIZED COAL

BACKGROUND OF THE INVENTION

Prior to the present invention, it has been known to manufacture granular activated carbon by pulverizing an anthracite or bituminous coal, reconstituting it with a binder to form a briquette, carbonizing the briquette material after sizing or crushing, and subsequently activating. The carbonizing step includes the effects of oxidizing and devolitalizing the coal. The conventional process involves a number of steps which require large and expensive equipment. A good quality, large-scale plant must include the equipment necessary to ensure proper quality control at each step, e.g., pulverization size, proper mix, correct temperature throughout, and a controlled oxidation procedure. Such equipment requires a large capital outlay and continuous maintenance.

Granular anthracite without binding, briquetting, etc., has been activated to high surface area activated carbon but it requires impractically long activation times and carefully controlled activation conditions. No commercial activated carbon is produced by this method.

Lignite has also been activated in the granular form without other treatment but it produces a weak particle of low surface area (about 600 square meters per gram) and low adsorptive capacity per unit volume. This type of activated carbon finds use mainly in liquid decolorization applications. An acid-washing step is frequently required in the production of activated carbon from lignite.

All of the above processes require large and expensive equipment -- pulverization equipment, mixing equipment, and carbonization equipment, in addition to the conventional activation equipment. And, as mentioned above, acid-washing facilities are sometimes needed. Such equipment requires a large capital outlay and continuous maintenance.

SUMMARY OF THE INVENTION

I have found that with the proper choice of coal a granular activated carbon can be made by following a few relatively simple steps which do not require a large capital outlay. I require a low-grade coal; that is, one which is non-coking, has high volatile matter, high bed moisture, e.g., greater than 10 percent, a high oxygen content (greater than 10 percent --- other than that contributed by the moisture) and relatively low B.t.u. content. I intend to include as starting materials all coals classified as high volatile bituminous C and lower rank coals. In particular, preferred coals are those ranked as sub-bituminous. See "Classification of Coals by Rank," a specification of the American Standards Association, ASTM designation D388-64T, published in 1964. The coals I use should have a bed moisture of about 10 to about 25 percent, and oxygen content from about 10 to about 25 percent, and a B.t.u. value no greater than about 11,000 (dry ash-free basis).

I first crush the coal and size it to a particle size from a No. 2 U.S. sieve to a No. 40 U.S. sieve.

High quality commercial activated carbons can be produced by placing the crushed coal particles in a dryer to remove essentially all the moisture (maximum about one percent moisture remaining) and to add 1 percent to about 3 percent oxygen to the coal. The addition of oxygen to the coal is a critical step in enhancing the activateability of the coal. The temperature during the drying an oxidizing treatment should be about 300°F (150°C) to about 425°F (215°C) for a period of from 18 hours in a static condition to about 30 minutes with the coal particles in a fluid condition.

The coal particles so dried and oxidized are then activated by conventional processes. Conventional activation processes may be used in my invention; they normally involve high-temperature operation between 1,000° to 2,000°F in a means for exposing the particles to a controlled oxygen activation atmosphere such as steam, carbon dioxide, air, or the like for a period of 30 minutes to 10 hours or more, depending on the degree of activation desired. Chemical agents such as zinc chloride, phosphoric acid, sulfuric acid, and others may also be used for activation at temperatures between 600° and 1,000°C. The method of activation is not critical to the operation of this invention.

The drying and oxidation step renders the coal particles activatable. These steps may be accomplished separately. Oxidation may be accomplished by the use of oxygen-enriched air, i.e., to the extent of 50 percent or more. The effect of the addition of oxygen to the sized (U.S. sieve series 8 × 30) coal is shown by the experimental results in Table I after activation.

TABLE I

Product Quality After Activation at 1,500°F
Improved by Oven-Drying as a Pretreatment Step

| Pretreatment | Overall Yield Percent | $I_2$ | $CCl_4$ | Apparent Density g/ml | Ash Percent |
|---|---|---|---|---|---|
| None | 30.5 | 692 | 33.4 | 0.403 | 5.99 |
| Air-Dry | 37.3 | 703 | 33.7 | 0.334 | 5.31 |
| Oven-Dry (in air) | 24.8 | 1009 | 54.8 | 0.447 | 6.73 |
| Oven-Dry (in air) | 30.2 | 861 | 43.0 | 0.491 | 5.57 |
| Oven-Dry (in $N_2$) | 29.2 | 747 | 36.7 | 0.407 | 5.86 |

The untreated coal was activated to a low density, low activity carbon. Simple air drying at ambient temperature (to about 15 percent moisture content from an initial 21 percent) gave no significant improvement in the activated product. However, both of the samples oven-dried in air exhibit high activity as measured by iodine number and carbon tetrachloride capacity, in addition to high apparent density. When the sample was oven-dried in nitrogen, an inferior product was again made. These data indicate that both moisture removal and oxidation is required to make a superior product.

Since drying in a static bed is an impractical commercial method of operation, other drying and oxidation methods were investigated in order to improve the efficiency of the drying and oxidation step. A rotary furnace was utilized in the experiments listed in Tables II and III to perform the drying and oxidation step.

TABLE II

Two Hour Oxidation Period in a Two-Inch Rotary Furnace

| Pretreatment | | Activation Results* | | | | | |
|---|---|---|---|---|---|---|---|
| Temp. °C | 1/Min. Air | Apparent Density g/cc | Mol | I$_2$ No. Wt. | Vol. | CCl$_4$ No. Wt. | Vol. |
| 150 | 1.0 | 0.492 | 225 | 886 | 435 | 48.5 | 23.8 |
| 175 | 1.0 | .492 | 229 | 912 | 449 | 48.1 | 23.6 |
| 205 | 1.0 | .469 | 238 | 944 | 442 | 49.1 | 23.1 |
| 150 | 0.1 | 0.485 | 217 | 856 | 415 | 43.8 | 21.2 |
| 175 | 0.1 | .484 | 224 | 894 | 432 | 45.7 | 22.1 |
| 205 | 0.1 | .463 | 223 | 866 | 401 | 43.1 | 19.9 |

*Activation at 1,650°F in steam.

TABLE III

Oxidation at 175°C in a Two-Inch Rotary Furnace
(1.0 liter air/min)

| Oxidation Time, Hrs. | Activation Results* | | | | | |
|---|---|---|---|---|---|---|
| | Apparent Density g/cc | Mol | I$_2$No. Wt. | Vol. | CCl$_4$ No. Wt. | Vol. |
| 1 | 0.475 | 216 | 916 | 434 | 46.6 | 22.1 |
| 2 | .484 | 224 | 894 | 432 | 45.7 | 22.1 |
| 3 | .514 | 220 | 944 | 485 | 48.8 | 25.1 |
| 4 | .514 | 232 | 926 | 475 | 48.0 | 24.7 |
| 5 | .508 | 233 | 960 | 486 | 49.8 | 25.3 |

*Activation at 1,650°F in steam.

The effects of air flow, oxidation time, and temperature were investigated. From the tables above, it is apparent that at the optimum temperature of treatment, which is 175° to 200°C, activated carbons with the highest volume activities were produced. An air flow of one liter per minute for the 100 gram coal charge produced better results than an air flow of 0.1 per liter per minute. Continuing the oxidation step beyond 3 hours in this apparatus gave no further improvement in activity of the product after activation.

A batch fluid reactor was utilized to investigate the oxidation step further. Data from these tests are given in Table IV. Once again, optimum operating temperature is approximately 200°C but the treatment time is reduced to approximately 30 minutes using the fluidizing technique.

The importance of oxidation of the coal and quantification of this effect was noted in thermal gravimetric analyses which were run on the coal at 200°C in an atmosphere of air. The oxygen pickup as percent by weight of the sample was determined by thermal gravimetric analysis for coals which had been previously treated in the fluidizng unit in air at 200°C. The coal which produced the best activated carbon as indicated in Table IV exhibited the least oxygen pickup, indicating the oxidation of the coal was completed. A sample of the coal which had been dried in nitrogen in the fluid unit at 200°C had the highest oxygen pickup indicating that the coal had not been oxidized by the pretreatment and confirming the reason for the inferior activated product produced by a nitrogen dried coal (Table I).

TABLE V

Thermal Gravimetric Analysis Results at 200°C

| Pretreatment | Oxygen Pickup Percent |
|---|---|
| 60 Minutes Fluid Air | 0 |
| 30 Minutes Fluid Air | 0.03 |
| 20 Minutes Fluid Air | 0.18 |
| 10 Minutes Fluid Air | 0.56 |
| 10 Minutes Fluid Nitrogen | 1.41 |

TABLE IV

Activated Products From 8 × 30 Sub-bituminous Coal
By Fluid Oxidation

| Oxidizing Time At Temperature | Temperature °C | °F | Activated Product* | | | | | |
|---|---|---|---|---|---|---|---|---|
| | | | Apparent Density g/cc | Mol | I$_2$ No. Wt. | Vol. | CCl$_4$ No. Wt. | Vol. |
| 10 Min. | 150 | 300 | 0.455 | 209 | 716 | 327 | 35.7 | 15.7 |
| 20 Min. | 150 | 300 | .446 | 212 | 734 | 327 | 35.2 | 16.3 |
| 30 Min. | 150 | 300 | .493 | 218 | 768 | 379 | 35.3 | 17.5 |
| 5 Min. | 216–255 | 420–490 | 0.468 | 215 | 880 | 411 | 43.8 | 20.5 |
| 10 Min | 200–230 | 400–500 | .499 | 222 | 878 | 439 | 44.8 | 22.3 |
| 20 Min. | 110–188 | 230–370 | .500 | 220 | 910 | 455 | 43.8 | 21.9 |
| 1 Hr. | 190 | 375 | 0.526 | 235 | 821 | 432 | 38.6 | 20.3 |
| 30 Min. | 190 | 375 | .502 | 237 | 817 | 410 | 38.6 | 19.4 |
| 20 Min. | 190 | 375 | .500 | 224 | 810 | 405 | 38.1 | 19.5 |
| 1 Hr. | 218 | 425 | 0.525 | 244 | 920 | 484 | 46.7 | 24.6 |
| 30 Min. | 218 | 425 | .500 | 206 | 912 | 456 | 44.6 | 22.3 |
| 20 Min. | 218 | 425 | .512 | 242 | 902 | 462 | 42.9 | 21.9 |

*Activation at 1,650°F in steam.

The nitrogen dried coal contained 17.0 percent oxygen while the air dried coal contained 20.2 percent oxygen, as determined by combustion analysis.

Table VI compares characteristics of a commercial carbon (FILTRASORB400) produced by Calgon Corporation and activated carbon produced by the techniques described herein.

TABLE VI

|  | FILTRASORB 400 | Granular Coal Based Carbon* |
|---|---|---|
| Apparent Density, g/cc | 0.479 | 0.460 |
| $I_2$ No. | 1139 | 1161 |
| Molasses No. | 285 | 222 |
| $CCl_4$, Percent Weight | 66.4 | 67.8 |
| Ash, Percent Weight | 5.2 | 7.5 |
| Pore Volume, cc/g | 1.18 | 1.12 |
| Surface Area, $m^2/g$ | 1140 | 1159 |

*Produced according to the invention.

I claim:
1. Method of making granular activated carbon comprising
   a. crushing and separating to a size in the range of 2 × 40 U.S. Sieve, a coal having an ASTM rank of High Volatile C Bituminous or lower and having greater than 10 percent by weight bed moisture and greater than 10 percent by weight oxygen content;
   b. heating said crushed and separated coal in air at a temperature of about 150°C. to about 215°C. for a period of from 30 minutes to 18 hours, whereby about 1 percent to about 3 percent by weight oxygen is added to the coal; and
   c. activating the thus oxidized coal at a temperature between 1,000°F. and 2,000°F. in a controlled oxygen atmosphere.
2. The method of claim 1 wherein in step (b) thereof the air is oxygen-enriched.

* * * * *